United States Patent
Hao et al.

(10) Patent No.: US 10,326,688 B2
(45) Date of Patent: Jun. 18, 2019

(54) METHOD AND APPARATUS FOR INSTANTIATING A PATH WITH THE MINIMUM NUMBER OF SEGMENTS

(71) Applicants: Fang Hao, Morganville, NJ (US);
Murali Kodialam, Marlboro, NJ (US);
T. V. Lakshman, Marlboro, NJ (US);
Ehsan Rezaaifar, Ottawa (CA)

(72) Inventors: Fang Hao, Morganville, NJ (US);
Murali Kodialam, Marlboro, NJ (US);
T. V. Lakshman, Marlboro, NJ (US);
Ehsan Rezaaifar, Ottawa (CA)

(73) Assignees: NOKIA OF AMERICA CORPORATION, Murray Hill, NJ (US); ALCATEL-LUCENT CANADA INC., Ontario (CA)

( * ) Notice: Subject to any disclaimer, the term of this patent is extended or adjusted under 35 U.S.C. 154(b) by 97 days.

(21) Appl. No.: 15/605,712

(22) Filed: May 25, 2017

(65) Prior Publication Data
US 2018/0343190 A1 Nov. 29, 2018

(51) Int. Cl.
*H04L 12/721* (2013.01)
*H04L 12/723* (2013.01)

(52) U.S. Cl.
CPC .......... *H04L 45/123* (2013.01); *H04L 45/50* (2013.01); *H04Q 2213/13138* (2013.01)

(58) Field of Classification Search
CPC .......... H04L 29/06095; H04L 29/0653; H04L 45/74; H04L 49/3009; H04L 49/309
USPC .................................................. 370/392
See application file for complete search history.

(56) References Cited

U.S. PATENT DOCUMENTS

| | | | | |
|---|---|---|---|---|
| 9,491,051 B2* | 11/2016 | Hui | .......................... | H04L 47/11 |
| 2007/0091811 A1* | 4/2007 | Thubert | ................ | H04L 43/022 370/238 |
| 2012/0005533 A1* | 1/2012 | Li | .......................... | G06F 11/008 714/26 |
| 2012/0213124 A1* | 8/2012 | Vasseur | ................... | H04L 41/12 370/255 |
| 2013/0159550 A1* | 6/2013 | Vasseur | ............... | H04W 40/248 709/242 |

(Continued)

OTHER PUBLICATIONS

"Traffic Engineering with Equal Cost Multipath: An Algorithmic Perspective"; Guy Kindler; Apr. 2017 (Year: 2017).*

(Continued)

*Primary Examiner* — Robert J Lopata
(74) *Attorney, Agent, or Firm* — Kramer Amado, P.C.

(57) ABSTRACT

Various embodiments relate to a method and apparatus for computing a minimum segment labeling of a given path on a segment cover graph, the method including receiving a connection request for a connection between a source node and a destination node, generating a Shortest Path Directed Acyclic Graph ("SPDAG") from the source node to the destination node by running a shortest path algorithm from the source node, determining an end node, between the source node and the destination node, at which the SPDAG deviates from the given path, determining whether the end node is the end of an Equal Cost Multipath ("ECMP") and terminating the shortest path algorithm at a predecessor node to the end node if the end node is the end of an ECMP and making the predecessor node to the end node the source node.

14 Claims, 6 Drawing Sheets

(56) References Cited

U.S. PATENT DOCUMENTS

| | | | | |
|---|---|---|---|---|
| 2013/0227055 A1* | 8/2013 | Vasseur | ............... | H04L 41/145 709/217 |
| 2013/0301470 A1* | 11/2013 | Thubert | ............... | H04L 45/128 370/254 |
| 2013/0308444 A1* | 11/2013 | Sem-Jacobsen | ...... | H04L 47/125 370/230 |
| 2014/0029610 A1* | 1/2014 | Vasseur | ............... | H04L 45/025 370/389 |
| 2014/0078927 A1* | 3/2014 | Thubert | ............... | H04L 45/507 370/254 |
| 2014/0126423 A1* | 5/2014 | Vasseur | .................. | H04L 45/48 370/255 |
| 2014/0129734 A1* | 5/2014 | Vasseur | ............... | H04L 45/121 709/241 |
| 2014/0269402 A1* | 9/2014 | Vasseur | ............... | H04L 45/302 370/253 |
| 2014/0314096 A1* | 10/2014 | Hui | ........................ | H04L 45/28 370/400 |
| 2014/0379900 A1* | 12/2014 | Dasgupta | .............. | H04L 41/145 709/224 |
| 2015/0117220 A1* | 4/2015 | Turanyi | .................. | H04L 47/32 370/236 |
| 2015/0143349 A1* | 5/2015 | Wang | ...................... | G06F 8/434 717/156 |
| 2017/0149639 A1* | 5/2017 | Vasseur | ............... | H04L 43/0835 |
| 2017/0310595 A1* | 10/2017 | Avidar | ................. | G06Q 10/047 |
| 2018/0227218 A1* | 8/2018 | Thubert | .................. | H04L 45/18 |

OTHER PUBLICATIONS

Filsfils, et al., "Segment Routing Architecture", draft-ieff-spring-segment-routing-12, Network Working Group, Internet Draft, Jun. 2017, 28 pages.

Filsfils, et al., "Segment Routing with MPLS data plane", data-ieff-sprig-segment-routing-mpls-06, Network Working Group, Internet-Draft, Jun. 2017, 15 pages.

\* cited by examiner

Path P

Path P

Distance Labels for Shortest path from node C

SPDAG (C)

METHOD AND APPARATUS FOR INSTANTIATING A PATH WITH THE MINIMUM NUMBER OF SEGMENTS

TECHNICAL FIELD

This disclosure relates generally to segment routing, and more specifically, but not exclusively, to determining the minimum number of segments needed to instantiate a given path in a segment routed network.

BACKGROUND

The goal of segment routing is to make simplified flexible connection routing in IP/MPLS networks by building largely on features of existing network protocols. The main idea in segment routing is to use a sequence of segments to compose the desired end-to-end connection path.

The path between the end points of each segment is determined by a conventional routing protocol like Open Shortest Path First ("OSPF").

The segment labels are carried in the packet header and so a per-flow state is maintained only at the ingress node. A segment label is like a Multiprotocol Label Switching ("MPLS") label and traditional push, pop, swap actions can be applied to it by the routers on the segment path.

Segment routing permits finer control of the routing paths and so segment routing can be used to distribute traffic for improved network utilization.

A central controller can utilize the full potential of segment routing by choosing segments based on the traffic pattern to judiciously distribute traffic in the network and avoid local hot-spots.

FIG. 1 illustrates a network with bi-directional links. The number next to each link is the Interior Gateway Protocol ("IGP") link weight. For example, to illustrate segment routing, a connection that has to be established between nodes A and Z, using OSPF has packets which belong to the flow A-N-Q-P-Z will be routed on the shortest path.

For example, assume that link N-Q and C-D are congested (i.e. hot-spots) and we want to route the packet on the path A-B-C-Q-P-Z, this is done by breaking the path into two segments A-B-C and C-Q-P-Z.

In addition to the destination address Z, the segment labels C and Q are added to the header. The packet is routed from A to C along the shortest path A-B-C and at node C, the top label is popped and the packet is routed to Q. At node Q, the second label is popped and the packet is routed to Z along the shortest path.

There is no per-flow state at any of the intermediate nodes in the network. If there are no segment identifiers, then packets are routed along shortest paths as in standard IGP routing protocols.

The other extreme is when each hop is specified in the packet header which is a form of explicit path routing. This fine grained control of the routing path enables the deployment of network functions like service chaining where the packet has to pass through a set of middle boxes when it goes from the source to destination.

Segment routing can also be used for steering traffic to avoid hot-spots in the network and thereby improve network utilization.

There are two basic types of segments: node and adjacency. A node segment identifies a router node. Node segment identifiers are globally unique across the domain.

An adjacency segment represents a local interface of a node. Adjacency segment identifiers are typically only locally significant on each node.

The MPLS data plane can be leveraged to implement segment routing essentially without modification since the same label switching mechanism can be used. Segment labels are distributed across the network using simple extensions to current IGP protocols and hence Label Distribution Protocol ("LDP") and Resource Reservation Protocol-Traffic Engineering ("RSVP-TE") are no longer required for distributing labels.

Therefore, the control plane can be significantly simplified. Moreover, unlike MPLS, there is no need to maintain a path state in segment routing except on the ingress node, because packets are now routed based on the list of segments they carry in the header of the packet.

The ingress node has to be modified since it needs to determine the path and add the segment labels to the packet. For traffic planning problems where the objective is to route traffic so that no link is overloaded, it is generally enough to consider segment routes with just two segments.

For example, a two-segment route is shown in FIG. 2. In the case of two-segment routing, traffic is routed though one intermediate node. In FIG. 2, the path A-B-C-D-Z is represented as two segments, one from A to C and the other from C to Z.

SUMMARY OF EXEMPLARY EMBODIMENTS

A brief summary of various embodiments is presented below. Embodiments address the need to determine the minimum number of segments needed to instantiate a given path in a segment routed network.

In order to overcome these and other shortcomings of the prior art and in light of the present need to determine the minimum number of segments needed to instantiate a given path in a segment routed network, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments relate to a method for computing a minimum segment labeling of a given path on a segment cover graph, the method including receiving a connection request for a connection between a source node and a destination node, generating a Shortest Path Directed Acyclic Graph ("SPDAG") from the source node by running a shortest path algorithm, determining an end node, between the source node and the destination node, at which the SPDAG deviates from the given path, determining whether the end node is the end of an Equal Cost Multipath ("ECMP"), and terminating the shortest path algorithm at a predecessor node to the end node when the end node is the end of an ECMP and making the predecessor node to the end node the source node.

In an embodiment of the present disclosure, The method further includes terminating the shortest path algorithm at the end node when the end node is not the end of an ECMP and making the end node the source node.

In an embodiment of the present disclosure, the method further includes determining whether the destination node has been reached.

In an embodiment of the present disclosure, the method further includes storing the minimum segment labeling of a given path.

In an embodiment of the present disclosure, if a number of predecessor nodes from the end node is greater than 1, then the end node is the end of an ECMP.

In an embodiment of the present disclosure, determining whether the end node is the end of an ECMP is determining whether the path from the source node to the end node is unique.

Various embodiments relate to a non-transitory machine-readable storage medium encoded with instructions executable to perform a method by a processor on a router for computing a minimum segment labeling of a given path on a segment cover graph, the machine-readable storage medium including instructions for receiving a connection request for a connection between a source node and a destination node, instructions for generating a Shortest Path Directed Acyclic Graph ("SPDAG") from the source node by running a shortest path algorithm, instructions for determining an end node, between the source node and the destination node, at which the SPDAG deviates from the given path, instructions for determining whether the end node is the end of an Equal Cost Multipath ("ECMP") and instructions for terminating the shortest path algorithm at a predecessor node to the end node when the end node is the end of an ECMP and making the predecessor node to the end node the source node.

In an embodiment of the present disclosure, the non-transitory machine-readable storage medium, further includes instructions for terminating the shortest path algorithm at the end node when the end node is not the end of an ECMP and making the end node the source node.

In an embodiment of the present disclosure, the non-transitory machine-readable storage medium, further includes instructions for storing the minimum segment labeling of a given path.

In an embodiment of the present disclosure, the non-transitory machine-readable storage medium, further includes instructions for determining whether the destination node has been reached.

In an embodiment of the present disclosure, if a number of predecessor nodes from the end node is greater than 1, then the end node is the end of an ECMP.

In an embodiment of the present disclosure, determining whether the end node is the end of an ECMP is determining whether the path from the source node to the end node is unique.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
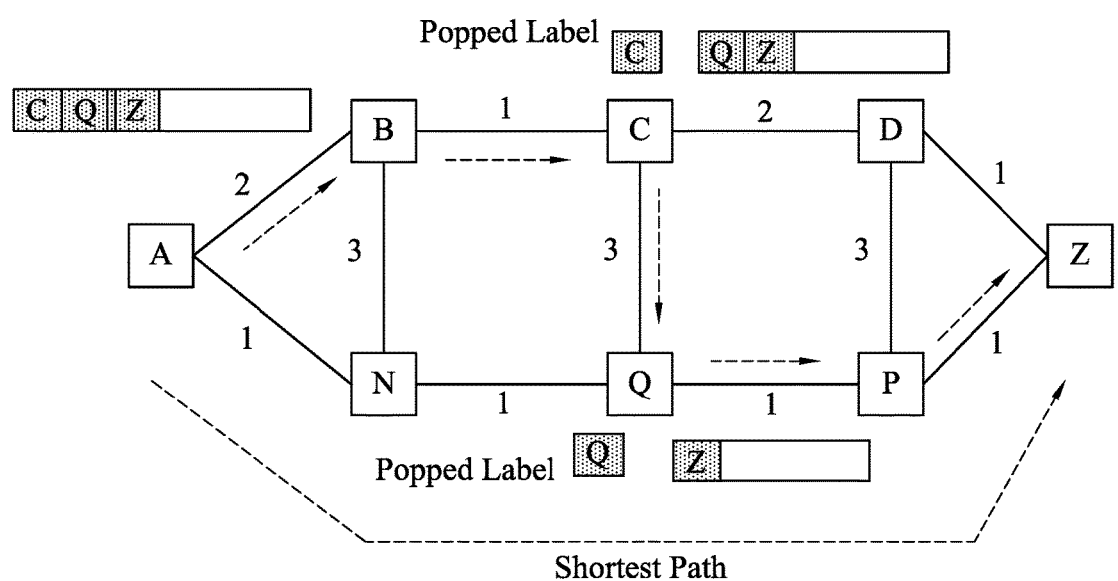
FIG. 1 illustrates an example of segment routing in a network with bi-directional links.
Figure 2:
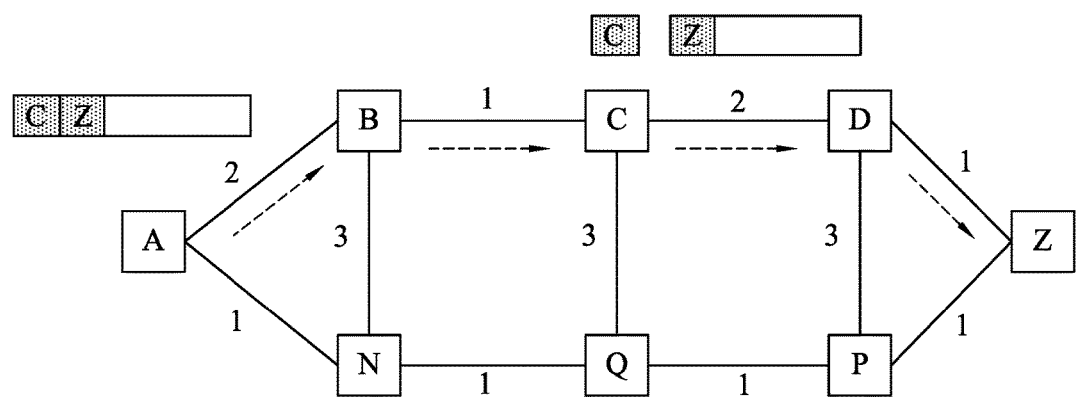
FIG. 2 illustrates an example of two segment routing.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

This disclosure outlines a method and apparatus for determining the minimum number of segments needed to instantiate a given path in a segment routed network and solving the problem of terminating Dijkstra's Algorithm at a node which is the end node of an Equal Cost Multipath ("ECMP").

Segment routing uses shortest path fragments to transfer packets from a source node to a destination node.

The most efficient way of representing an arbitrary path in a network in terms of segments is by the number of segments used to instantiate the path.

The Minimum Segment Cover Problem addresses the issue of determining the number of segments used to instantiate the path from a source node to a destination node.

The problem requires a weighted directed graph $G=(V, E)$, where V represents the set of nodes in the network, E represents the set of links and $w(e)$ represents the weight of link e, which are elements of E. A path P is defined as a path from a source node, s to a destination node, d.

The problem produces a partition of path P into the minimum number of shortest path segments and the corresponding packet header label, L.

Given a directed link e, T(e) represents the start node of the link and H(e) represents the end node of the link e. The path P is from a source node, s to a destination node, d and comprises of $k$ links $\{e_1, e_2 \ldots e_k\}$.

Figure 3:
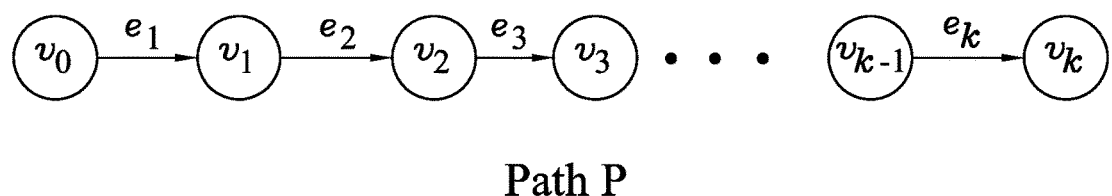
FIG. 3 illustrates a path P which includes a set of nodes and links.

FIG. 3 illustrates a path P which includes a set of nodes $\{v_0, v_1, v_2 \ldots v_{k-1}, v_k\}$ and links $\{e_1, e_2 \ldots e_k\}$.

In FIG. 3, $=v_{j-1}=T(e_j)$ and $v_j=H(e_j)$, for $j=1, 2, \ldots k$.

The predecessor of a node v is denoted as $\mu(v)$, where node $v \in P/s$.

For example, in FIG. 3, $\mu(v_2)=v_1$ and the value of $\mu(v)=-1$ for all other nodes (including $s=v_0$) in the network.

If there are equal cost paths in the network (i.e. multiple shortest paths between nodes), the shortest path to a given node may not be unique, and in this case, Dijkstra's algorithm starting from a source node, s outputs the Shortest Path Directed Acyclic Graph ("SPDAG") for source node, s.

The version of Dijkstra's algorithm below is used for an ECMP case:

---
Algorithm 1: ECMP-Dijkstra
---

Data: Graph G = (V,E); link weights c(e); Source Node s;
Result: ECMP-Dijkstra for generatin Shortest Path DAG
Set a ← s, $\pi(v) = \infty$ $\mu(v) = 0$ $\forall v \in V$, $\pi(s) = 0$
P = {s}.
while P ≠ V do
| for e : T(e) = u do
| | v = H (e)
| | if ($\pi(v) > \pi(u) + c(e)$) then
| | | $\pi(v) = \pi(u) + c(e)$
| | | $\mu(v) = 1$
| | | PRED(v) = u
| | else
| | | $\mu(v) \leftarrow \mu(v) + 1$
| | end
| end
| a = Argmin$_{v \notin P}$ $\pi(v)$
| P ← P ∪ {a}
end
Output all links e = (u,v) such that $\pi(u) + c(e) = \pi(v)$.

---

In Algorithm 1, in addition to maintaining $\pi(v)$, which represents the shortest path distance to a node v from a node, s, $\mu(v)$ is also maintained which represents the number of predecessor nodes to node v on the SPDAG(s).

For example, $\mu(v)$ is used to determine if there are multiple shortest paths from a node, s to a node, v. There are multiple shortest paths if $\mu(v) > 1$.

Figure 4A:
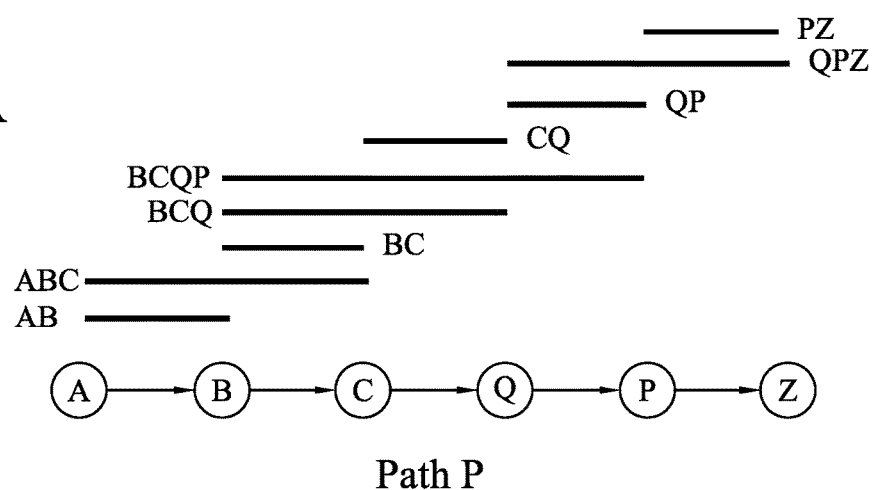
FIG. 4A illustrates a segment cover graph.
Figure 4B:
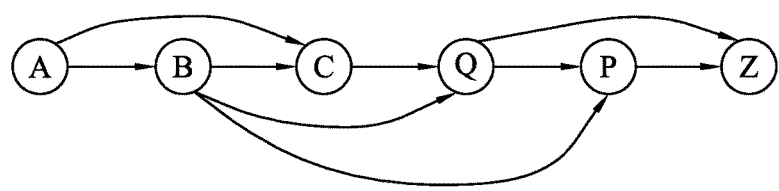
FIG. 4B illustrates a SPDAG.

FIG. 4A illustrates a segment cover graph. FIG. 4B illustrates a SPDAG for the segment cover graph of FIG. 4A and includes arcs between nodes if the shortest path between the nodes is unique. For example, an arc between nodes A and B, in the segment graph, if SPDAG(A, B)⊆P).

In various embodiments of the present disclosure, several algorithms may be used to compute the most efficient labeling scheme for a given path. Those algorithms include the Brute-Force Algorithm which computes the optimal labeling scheme using an explicitly constructed segment graph. The Greedy Algorithm for Minimum Segment Cover ("GMSC") which computes the shortest paths on a need basis. Finally, the Fast Greedy Algorithm for Minimum Segment Cover ("FGMSC") which terminates the Dijkstra algorithm early.

If the network implements ECMP, then the network traffic is split along equal cost shortest paths. The packets may be sent along one of the paths using a hashing function that hashes on a 5-tuple header. If Dijkstra's algorithm terminates at a node (at the end of a current segment) which is the end of an ECMP, then the packets may be sent along either of the equal cost paths.

Figure 5A:
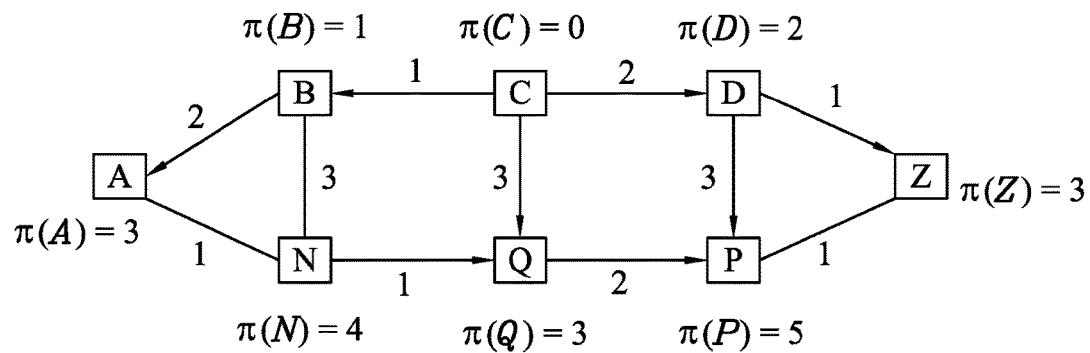
FIG. 5A illustrates a segment graph.
Figure 5B:
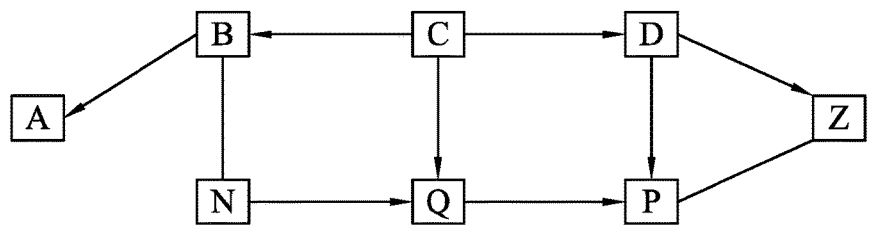
FIG. 5B illustrates a SPDAG.

For example, FIG. 5A illustrates the routing from a random node C. FIG. 5A includes the weight per link in the segment graph. FIG. 5 illustrates a SPDAG(C), for node C. There are two alternate shortest paths between node C and node P.

Packets will be routed along C-D-P or C-Q-P based on the hashing function, which hashes on a 5-tuple header.

Since there are two equal shortest paths, in order to route the packets on either C-D-P or C-Q-P, there must be explicit instruction, which is defined by the Brute-Force Algorithm.

In Algorithm 1, the variable PRED(v) represents the main change from the standard Dijkstra's algorithm, because in addition to the distance label that represents the shortest path length, the algorithm maintains another counter $\mu(v)$ which gives the number of predecessor nodes from the shortest path from a node, s to a node, v.

The counter, $\mu(v)$ is used to determine whether the shortest path to a node is unique or not. After the execution of Dijkstra's ECMP Algorithm (Algorithm 1), all links e=(u, v) in the segment graph such that $\pi(u)+c(e)=\pi(v)$ are the links that belong in some shortest path.

After the SPDAG(s) has been computed, it can be determined whether the shortest path from a node s to any other node v is unique or not.

---
Algorithm 2: Unique Path
---

Data: SPDAG(s); Node v;
Result: U (s,v) = 0 if shortest path from s to v is not unique
U (s,v) = 1 if shortest path from s to v is unique
Set a ← v
while a ≠ s do
| if $\mu(v) = 1$ then
| | a ← PRED(a)
| else
| | Return(U(s,v) = 0)
| end
end
Return(U(s,v) = 1)

---

Algorithm 2 illustrates that if $\mu(v)=1$, then the shortest path from node s to node v is unique and if $\mu(v)>1$ then the shortest path from node s to node v is not unique.

If any of the nodes on the path from node s to node v in the SPDAG(s) has a degree greater than one, then the shortest path from node s to node v is not unique and if all of the nodes on the path in the SPDAG(s) have a degree equal to one then the shortest path from the node s to the node v is unique.

In an embodiment of the present disclosure, the Brute-Force Algorithm may explicitly construct the segment cover graph and determine the minimum hop path in the segment graph in order to find the path with the minimum number of segments for the path from a node s to a node v.

---
Algorithm 3: Brute-Force with ECMP
---

Data: Graph G = (V,E); link weights c(e); Segment Routed Path
P = $e_i$, $e_e$,...,$e_k$ between nodes s and d
Result: Label L with minimum number of nodes
Set the nodes in $G_P$ to {$v_0, v_1,..., v_k$}
Set the links in $G_P$ to ∅
Let $v_{i-1} = T(e_i)$ and Segment Cover Graph SCG = ∅
for 0 ≤ i ≤ k do
| Find SPDAG($v_i$)
| for j > i do
| | If SP($v_i, v_j$) ⊆ P and U($v_i, v_j$) = 1 then
| | | Add link between $v_i$ and $v_j$ in $G_P$
| | end
| end
end
Find min hop path between $v_o$ and $v_k$ in $G_P$
Let PRED(v) be the predecessor of node v on the min-hop tree
Set c = d and L = d
while c ≠ s do
| c ← PRED(c)
| L ← Ld
end

---

FIG. 4A illustrates the shortest paths between each node where ECMP is used. The arcs in FIG. 4B illustrate the shortest paths which are unique.

In an embodiment of the present disclosure, the Greedy Minimum Segment Cover Algorithm computes only a necessary subset of the covering segments.

---
Algorithm 4: ECMP Greedy Minimum
Segment Cover Algorithm (GMSC)
---

Data: Graph G = (V,E); link weights c(e); Segment Routed Path
 P = $e_i, e_e, \ldots, e_k$ between nodes s and d
Result: Label L with minimum number of nodes
Set c ← s, L ← ∅ A → {1,2...,k}
while A ≠ ∅ do
 | Run Dijkstra from c and determine SPDAG(c)
 | Find t = Arg $\min_{j \in A}$ {$e_j \notin$ SPDAG(c) or $\mu T(e_j) > 1$}
 | Set t ← ∞ if for all j ∈ A, $e_j$ ∈ SP(e)
 | If t ≤ k then
 | | c ← T($e_t$), A ← {t,t + 1,...k}, L ← Lc
 | else
 | | Set A = ∅ and L ← Ld
 | end
end

---

The GMSC obtains the optimal solution by the fact that any subset of a shortest path is itself a shortest path.
In the GMSC algorithm:

$$t = \underset{j \in A}{\operatorname{Argmin}} \{e_j \notin SPDAG(e) \text{ or } \mu(T(e_j)) > 1\}$$

The FGMSC finds the first place where the current SPDAG deviates from the given path.

---
Algorithm 5: Fast Greedy Min Segment Cover (FGMSC)
---

Data: Graph G = (V,E); link weights c(e); Segment Routed Path
 P = $e_i, e_e, \ldots, e_k$ between nodes s and d
Result: label L with minimum number of nodes
Set c ← s, L ← ∅ A → {1,2...,k}
while A ≠ ∅ do
 | t ← Next Node(c)
 | if t ≤ k then
 | | c ← T($e_t$), A ← {t,t + 1,...k}, L ← Le
 | else
 | | Set A = ∅ and L ← Ld
 | end
end

---

In order to reduce the running time of the algorithm, the ECMP-Dijkstra Algorithm (Algorithm 1) terminates when the last node in the current segment is determined.

The FGMSC Algorithm calls Next Node(c), which gives the last node of the current segment when the start node of the current segment is c.

---
Algorithm 6: Next Node(c)
---

Data: Graph G = (V,E); link weights c(e);
 Node c ∈ P
Result: First Node in the next segment
Set c ← s, π(v) = ∞ ∀v ∈ V, π(s) = 0
P = {0}, LB = 0 UB = ∞ ρ(v) = ∅ ∀v ∈ V
ρ(T($e_j$)) = $e_j$, η(T($e_j$)) = j $\forall_j$ ≥ p.
while UB − LB > 1 do
 | u = $\operatorname{Argmin}_{v \notin P}$ π(v)
 | P ← P ∪ {u}
 | if (ρ(u) = PRED(u) and μ(u) = 1) then
 | | LB = η(u)
 | else
 | | UB = η(u)
 | end ---
Algorithm 6: Next Node(c)
---

| for e : T(e) = u do
 | | v = H(e)
 | | if (π(v) > π(u) + c(e)) then
 | | | π(v) = π(u) + c(e)
 | | | μ(v) = 1
 | | | PRED(v) = u
 | | else
 | | | μ(v) ← μ(v) + 1
 | | end
 | end
end
Return(LB)

---

Figure 6:
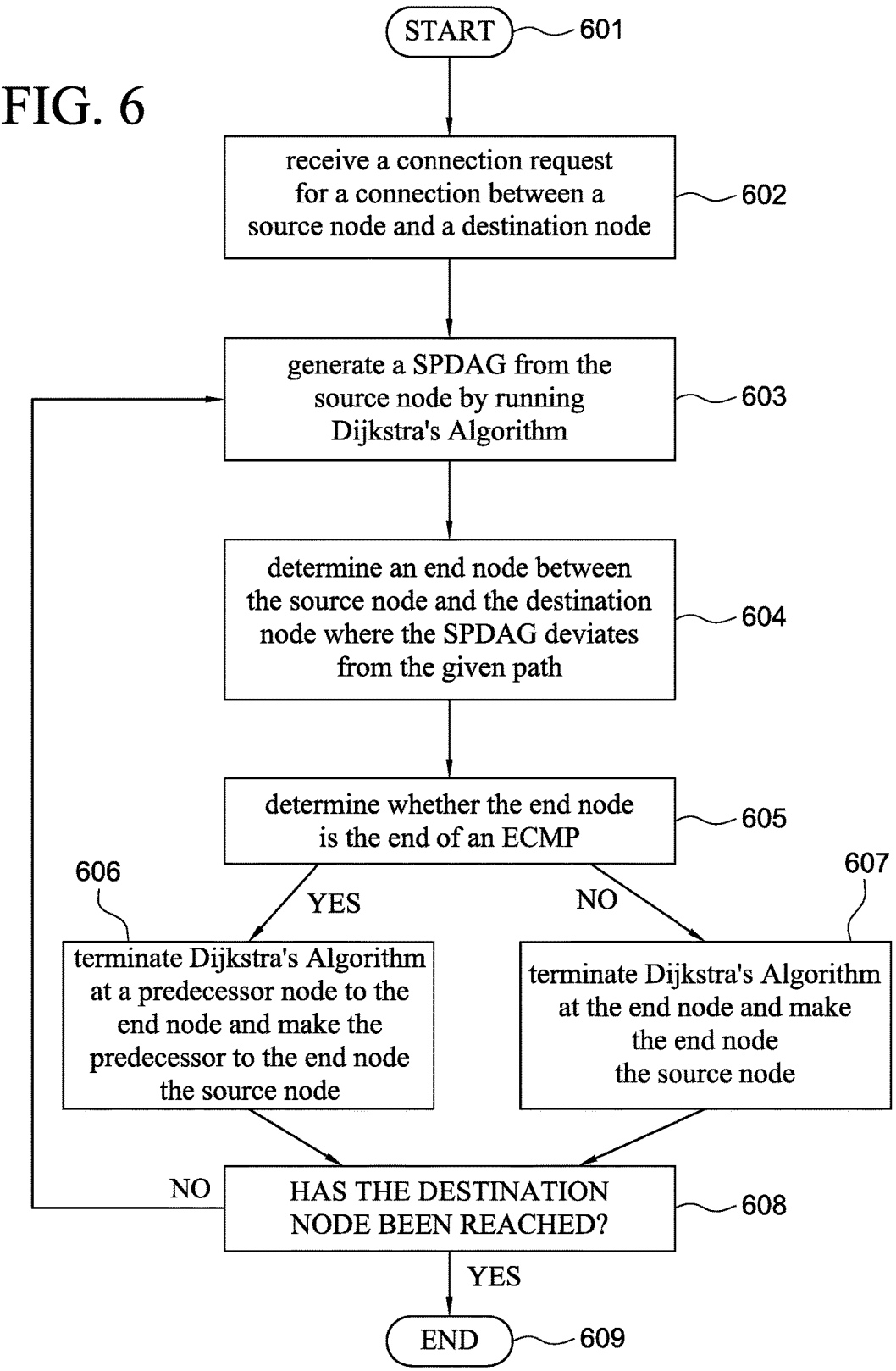
FIG. 6 illustrates a method for computing a minimum segment labeling of a given path on a segment cover graph.

FIG. 6 illustrates a method for computing a minimum segment labeling of a given path on a segment cover graph.

The method 600 begins at step 601 and proceeds to step 602 where a request for a connection between a source node and a destination node is received.

The method 600 proceeds to step 603 where a SPDAG is generated from the source node by running Dijkstra's Algorithm.

The method 600 proceeds to step 604 where an end node between the source node and the destination node is determined where the SPDAG deviates from the given path.

The method 600 proceeds to step 605 where a determination is made whether the end node is the end of an ECMP. If yes, the method 600 proceeds to step 606 where Dijkstra's Algorithm is terminated at a predecessor node to the end node and make the predecessor node to the end node the source node. If no, the method 600 proceeds to step 607 where Dijkstra's Algorithm is terminated at the end node and make the end node the source node.

The method 600 then proceeds to step 608 where a determination is made whether the destination node has been reached. If no, the method proceeds back to step 603 to repeat the process. If yes, the method ends at step 609.

In summary, determining a minimum number of shortest path segments from a source node to a destination node is accomplished by executing the algorithms discussed above. A modified version of Dijkstra's Algorithm is executed on a source node of the segment graph, the result is the SPDAG. The modification of Dijkstra's Algorithm includes the addition of a counter, μ(v) which is associated with a node at the end of the current segment (i.e. where the SPDAG deviates from the current path from the segment graph) and provides the number of predecessor nodes.

Algorithm 1 executes the modified version of Dijkstra's Algorithm on the source node to generate the SPDAG and includes counter which determines whether the pathway from the source node to a node at the end of the current segment is unique.

Algorithm 2 determines whether the current segment is unique. If the pathway is unique, then the modified version of Dijkstra's Algorithm is repeated on the node at the end of the current segment. However, if the pathway is not unique (i.e. the node at the end of the current segment is the end of an ECMP), then the modified version of Dijkstra's Algorithm is executed on the predecessor node.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for computing a minimum segment labeling of a given path on a segment cover graph, the method comprising:
   receiving a connection request for a connection between a source node and a destination node;
   generating a Shortest Path Directed Acyclic Graph ("SPDAG") from the source node by running a shortest path algorithm;
   determining an end node, between the source node and the destination node, at which the SPDAG deviates from the given path; and
   determining whether the end node is the end of an Equal Cost Multipath ("ECMP"); terminating the shortest path algorithm at a predecessor node to the end node, wherein a counter provides a number of predecessor nodes and determines whether a shortest path from the source node to the end node is unique, when the end node is the end of the ECMP.

2. The method of claim 1, further comprising:
   terminating the shortest path algorithm at the end node when the end node is not the end of the ECMP; and
   making the end node the source node.

3. The method of claim 1, further comprising:
   determining whether the destination node has been reached.

4. The method of claim 1, further comprising:
   storing the minimum segment labeling of the given path.

5. The method of claim 1, wherein after a number of predecessor nodes from the end node is greater than 1, then the end node is the end of the ECMP.

6. The method of claim 1, wherein determining whether the end node is the end of the ECMP is determining whether the shortest path from the source node to the end node is unique.

7. A non-transitory machine-readable storage medium encoded with instructions executable to perform a method by a processor on a router for computing a minimum segment labeling of a given path on a segment cover graph, the machine-readable storage medium comprising:
   instructions for receiving a connection request for a connection between a source node and a destination node;
   instructions for generating a Shortest Path Directed Acyclic Graph ("SPDAG") from the source node by running a shortest path algorithm;
   instructions for determining an end node, between the source node and the destination node, at which the SPDAG deviates from the given path;
   instructions for determining whether the end node is the end of an Equal Cost Multipath ("ECMP"), and
   instructions for terminating the shortest path algorithm at a predecessor node to the end node, wherein a counter provides a number of predecessor nodes and determines whether a shortest path from the source node to the end node is unique, when the end node is the end of the ECMP.

8. The non-transitory machine-readable storage medium of claim 7, further comprising:
   instructions for terminating the shortest path algorithm at the end node when the end node is not the end of the ECMP and making the end node the source node.

9. The non-transitory machine-readable storage medium of claim 7, further comprising:
   instructions for storing the minimum segment labeling of the given path.

10. The non-transitory machine-readable storage medium of claim 7, further comprising:

instructions for determining whether the destination node has been reached.

11. The non-transitory machine-readable storage medium of claim 7, wherein after a number of predecessor nodes from the end node is greater than 1, then the end node is the end of the ECMP.

12. The non-transitory machine-readable storage medium of claim 7, wherein determining whether the end node is the end of the ECMP is determining whether the shortest path from the source node to the end node is unique.

13. The method of claim 1, further comprising:
making the predecessor node to the end node the source node.

14. The non-transitory machine-readable storage medium of claim 7, further comprising:
instructions for making the predecessor node to the end node the source node.

* * * * *